United States Patent
Lee et al.

(10) Patent No.: US 12,308,481 B2
(45) Date of Patent: May 20, 2025

(54) BATTERY MODULE, BATTERY PACK AND VEHICLE

(71) Applicant: LG ENERGY SOLUTION, LTD., Seoul (KR)

(72) Inventors: Bum-Jick Lee, Daejeon (KR); Young-Su Son, Daejeon (KR); Hyoung-Chul Yoon, Daejeon (KR); Young-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 470 days.

(21) Appl. No.: 17/771,199

(22) PCT Filed: Nov. 11, 2020

(86) PCT No.: PCT/KR2020/095137
§ 371 (c)(1),
(2) Date: Apr. 22, 2022

(87) PCT Pub. No.: WO2021/112655
PCT Pub. Date: Jun. 10, 2021

(65) Prior Publication Data
US 2022/0367993 A1 Nov. 17, 2022

(30) Foreign Application Priority Data
Dec. 4, 2019 (KR) .................. 10-2019-0160106

(51) Int. Cl.
*H01M 50/176* (2021.01)
*H01M 50/213* (2021.01)
(Continued)

(52) U.S. Cl.
CPC ....... *H01M 50/588* (2021.01); *H01M 50/213* (2021.01); *H01M 50/3425* (2021.01);
(Continued)

(58) Field of Classification Search
CPC ............ H01M 50/588; H01M 50/213; H01M 50/3425; H01M 50/503; H01M 50/548;
(Continued)

(56) References Cited

U.S. PATENT DOCUMENTS

2012/0164490 A1 6/2012 Itoi et al.
2014/0154530 A1 6/2014 Fujiwara et al.
(Continued)

FOREIGN PATENT DOCUMENTS

CN 105552264 A 5/2016
CN 205231148 U 5/2016
(Continued)

OTHER PUBLICATIONS

First Office Action issued in corresponding Japanese Patent Application No. 2022-506822, dated on Feb. 27, 2023.
(Continued)

*Primary Examiner* — Cynthia K Walls
(74) *Attorney, Agent, or Firm* — Morgan, Lewis & Bockius LLP

(57) ABSTRACT

Disclosed is a battery module and a battery pack with improved durability. The battery module includes a plurality of cylindrical battery cells each respectively having electrode terminals; a module case having an accommodation portion in which the plurality of cylindrical battery cells are accommodated; a bus bar including a plate-shaped and electrically conductive body portion, and a connection portion configured to contact the electrode terminals to electrically connect the plurality of cylindrical battery cells to each other; an electrically insulating insulation sheet covering an outer side of the bus bar, the insulation sheet having an exposure hole through which at least a part of the bus bar is exposed to an outside; and an electrically insulating adhe-
(Continued)

sive on the at least a part of the bus bar exposed to the outside through the exposure hole of the insulation sheet.

9 Claims, 14 Drawing Sheets

(51) Int. Cl.
  *H01M 50/342* (2021.01)
  *H01M 50/503* (2021.01)
  *H01M 50/548* (2021.01)
  *H01M 50/559* (2021.01)
  *H01M 50/578* (2021.01)
  *H01M 50/583* (2021.01)
  *H01M 50/588* (2021.01)
  *H01M 50/593* (2021.01)

(52) U.S. Cl.
  CPC ....... *H01M 50/503* (2021.01); *H01M 50/548* (2021.01); *H01M 50/559* (2021.01); *H01M 50/578* (2021.01); *H01M 50/583* (2021.01); *H01M 50/593* (2021.01); *H01M 2200/103* (2013.01); *H01M 2200/20* (2013.01); *H01M 2220/20* (2013.01)

(58) Field of Classification Search
  CPC ............ H01M 50/559; H01M 50/578; H01M 50/583; H01M 50/593; H01M 2200/103; H01M 2200/20; H01M 2220/20; H01M 50/505; H01M 50/595; H01M 50/30; H01M 50/24; H01M 50/574; H01M 50/572; H01M 50/20; H01M 50/581; Y02E 60/10
  See application file for complete search history.

(56) References Cited

U.S. PATENT DOCUMENTS

| | | |
|---|---|---|
| 2016/0118633 A1 | 4/2016 | Hongo et al. |
| 2016/0315304 A1 | 10/2016 | Biskup |
| 2017/0346050 A1 | 11/2017 | Morioka |
| 2019/0109313 A1 | 4/2019 | Ryu et al. |
| 2019/0140252 A1 | 5/2019 | Guen |
| 2019/0267600 A1 | 8/2019 | Robert et al. |
| 2021/0036300 A1 | 2/2021 | Bae |

FOREIGN PATENT DOCUMENTS

| | | |
|---|---|---|
| CN | 205564866 U | 9/2016 |
| JP | 2011-065906 A | 3/2011 |
| JP | 2014-110139 A | 6/2014 |
| JP | 5897551 B2 | 3/2016 |
| JP | WO2016/072054 A1 | 5/2016 |
| JP | 6018937 B2 | 11/2016 |
| JP | 2017-212065 A | 11/2017 |
| JP | 2018-018641 A | 2/2018 |
| KR | 10-1065926 B1 | 9/2011 |
| KR | 10-1432459 B1 | 8/2014 |
| KR | 10-2017-0121998 A | 11/2017 |
| KR | 10-2018-0064221 A | 6/2018 |
| KR | 10-1916429 B1 | 11/2018 |
| KR | 10-2019-0069128 A | 6/2019 |
| KR | 10-2019-0093008 A | 8/2019 |
| WO | 2019/151609 A1 | 8/2019 |

OTHER PUBLICATIONS

Extended European Search Report issued in corresponding European Patent Application No. 20895430.5 dated Sep. 7, 2022.
International Search Report (with partial English translation) and Written Opinion issued in corresponding International Patent Application No. PCT/KR2020/095137 dated Feb. 26, 2021.
Office Action issued Aug. 24, 2023 for corresponding Chinese Patent Application No. 202080057380.6 Citation: JP 2018-018641 A is of record.

FIG. 16

<BATTERY MODULE A>

BEFORE VIBRATION TEST

| BANK | AC INTERNAL RESISTANCE (mΩ) |
|---|---|
| 1 | 5.0 |
| 2 | 5.0 |
| 3 | 5.0 |
| 4 | 5.0 |
| 5 | 5.0 |
| 6 | 5.0 |
| 7 | 5.7 |
| 8 | 5.1 |
| 9 | 5.0 |
| 10 | 5.0 |
| 11 | 5.0 |
| 12 | 5.0 |
| 13 | 4.9 |
| 14 | 4.8 |

AFTER Z-AXIS TEST

| BANK | AC INTERNAL RESISTANCE (mΩ) |
|---|---|
| 1 | 4.8 |
| 2 | 4.9 |
| 3 | 4.9 |
| 4 | 5.0 |
| 5 | 5.1 |
| 6 | 5.1 |
| 7 | 5.8 |
| 8 | 5.1 |
| 9 | 5.0 |
| 10 | 5.0 |
| 11 | 5.1 |
| 12 | 5.0 |
| 13 | 4.8 |
| 14 | 4.8 |

AFTER Y-AXIS TEST

| BANK | AC INTERNAL RESISTANCE (mΩ) |
|---|---|
| 1 | 4.9 |
| 2 | 5.0 |
| 3 | 4.9 |
| 4 | 5.0 |
| 5 | 5.0 |
| 6 | 5.1 |
| 7 | 5.8 |
| 8 | 5.1 |
| 9 | 5.0 |
| 10 | 5.0 |
| 11 | 5.0 |
| 12 | 5.0 |
| 13 | 4.8 |
| 14 | 4.8 |

AFTER X-AXIS TEST

| BANK | AC INTERNAL RESISTANCE (mΩ) |
|---|---|
| 1 | 4.8 |
| 2 | 5.0 |
| 3 | 4.8 |
| 4 | 5.0 |
| 5 | 5.0 |
| 6 | 5.0 |
| 7 | 5.8 |
| 8 | 5.1 |
| 9 | 4.8 |
| 10 | 5.0 |
| 11 | 4.8 |
| 12 | 4.9 |
| 13 | 4.7 |
| 14 | 4.7 |

FIG. 17

<BATTERY MODULE B>

BEFORE VIBRATION TEST

| BANK | AC INTERNAL RESISTANCE (mΩ) |
|---|---|
| 1 | 5.0 |
| 2 | 5.0 |
| 3 | 5.0 |
| 4 | 5.0 |
| 5 | 4.9 |
| 6 | 5.1 |
| 7 | 5.6 |
| 8 | 5.1 |
| 9 | 4.9 |
| 10 | 5.1 |
| 11 | 4.9 |
| 12 | 5.0 |
| 13 | 4.9 |
| 14 | 4.8 |

AFTER Z-AXIS TEST

| BANK | AC INTERNAL RESISTANCE (mΩ) |
|---|---|
| 1 | 5.0 |
| 2 | 5.0 |
| 3 | 5.0 |
| 4 | 5.0 |
| 5 | 5.0 |
| 6 | 5.0 |
| 7 | 5.6 |
| 8 | 5.0 |
| 9 | 4.8 |
| 10 | 5.0 |
| 11 | 4.9 |
| 12 | 5.0 |
| 13 | 4.9 |
| 14 | 4.8 |

AFTER Y-AXIS TEST

| BANK | AC INTERNAL RESISTANCE (mΩ) |
|---|---|
| 1 | 4.9 |
| 2 | 5.0 |
| 3 | 4.9 |
| 4 | 5.0 |
| 5 | 4.9 |
| 6 | 5.0 |
| 7 | 5.7 |
| 8 | 5.0 |
| 9 | 4.9 |
| 10 | 5.0 |
| 11 | 5.0 |
| 12 | 5.0 |
| 13 | 5.0 |
| 14 | 4.8 |

AFTER X-AXIS TEST

| BANK | AC INTERNAL RESISTANCE (mΩ) |
|---|---|
| 1 | 5.1 |
| 2 | 5.1 |
| 3 | 4.8 |
| 4 | 5.0 |
| 5 | 4.9 |
| 6 | 5.0 |
| 7 | 5.6 |
| 8 | 5.1 |
| 9 | 5 |
| 10 | 5 |
| 11 | 4.9 |
| 12 | 5 |
| 13 | 4.9 |
| 14 | 4.8 |

BATTERY MODULE, BATTERY PACK AND VEHICLE

TECHNICAL FIELD

The present disclosure relates to a battery module, and a battery pack and a vehicle including the same, and more particularly, to a battery module with improved manufacture efficiency and durability, and a battery pack and a vehicle including the same.

The present application claims priority to Korean Patent Application No. 10-2019-0160106 filed on Dec. 4, 2019 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and a cylindrical battery can serving as an exterior for hermetically containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power.

Meanwhile, recently, as the need for a large-capacity structure increases along with the utilization as an energy storage source, the demand for a battery pack including a plurality of secondary batteries connected in series and/or in parallel, a module case accommodating the secondary batteries therein, a battery management system (BMS), and a pack housing accommodating these components therein increases.

At this time, the bus bar includes connection portions of various shapes for electrically connecting to a plurality of secondary batteries. However, if the battery pack is exposed to an environment where the battery pack is severely shaken and external shocks occur frequently, for example, when if being mounted on a vehicle, a portion of the bus bar with weak mechanical stiffness may be easily damaged due to frequent vibrations or external shocks caused by the vibration of the vehicle body, or the electrical connection structure between the secondary battery and the bus bar may be easily cut. Accordingly, the durability of the battery module may be greatly decreased.

DISCLOSURE

Technical Problem

The present disclosure is designed to solve the problems of the related art, and therefore the present disclosure is directed to providing a battery module with improved durability, and a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:
- a plurality of cylindrical battery cells respectively having electrode terminals;
- a module case having an accommodation portion for accommodating the plurality of cylindrical battery cells;
- a bus bar including a body portion having electric conductivity and configured in a plate shape, and a connection portion configured to contact the electrode terminals to electrically connect the plurality of cylindrical battery cells to each other;
- an insulation sheet having electric insulation and located to cover an outer side of the bus bar, the insulation sheet having an exposure hole through which at least a part of the bus bar is exposed to the outside; and
- an adhesive having electric insulation and applied to the at least a part of the bus bar exposed to the outside through the exposure hole of the insulation sheet.

Also, the bus bar may include a fuse unit configured to connect the connection portion and the body portion to each other, the fuse unit being configured to be disconnected when a current over a predetermined level flows from the cylindrical battery cell, and
  the exposure hole of the insulation sheet may be located to expose the fuse unit to the outside.

Moreover, the cylindrical battery cell may include a negative electrode terminal and a positive electrode terminal respectively formed at one end and the other end thereof, the cylindrical battery cell having a gas venting unit configured to discharge an internal gas by opening any one of the positive electrode terminal and the negative electrode terminal when an internal pressure increases over a predetermined level, and
  the fuse unit of the bus bar may be formed to be connected only to the connection portion that is connected to the positive electrode terminal or the negative electrode terminal opened by the gas venting unit.

In addition, the insulation sheet may have an application hole through which the adhesive is added to bond a part of the body portion of the bus bar to the module case.

Further, a part of the adhesive may be cured in the form of being interposed between the insulation sheet and the body portion of the bus bar.

Also, the insulation sheet may have a guide portion protruding inward from the exposure hole to prevent the adhesive added to the exposure hole from being lost around the exposure hole.

Moreover, the guide portion may have a bent structure formed by bending a part thereof to cover an outer side of the cylindrical battery cell.

In addition, the insulation sheet may have a funnel portion protruding outward from the exposure hole to prevent the adhesive added to the exposure hole from being lost around the exposure hole.

Also, in order to accomplish the above object, a battery pack according to the present disclosure comprises at least one battery module according to the present disclosure.

In addition, in order to accomplish the above object, a vehicle according to the present disclosure comprises at least one battery pack according to the present disclosure.

Advantageous Effects

According to an embodiment of the present disclosure, the insulation sheet having electric insulation is positioned to cover the outer side of the bus bar and has the exposure hole formed to expose at least a part of the bus bar to the outside, and also the adhesive having electric insulation is applied to at least a part of the bus bar exposed to the outside through the exposure hole of the insulation sheet, so it is possible to prevent a portion of the bus bar with weak mechanical rigidity from being damaged. Accordingly, the battery module of the present disclosure may significantly reduce the occurrence of accidents such as damage to the bus bar or disconnection of the electrical connection even in an environment with external shock or frequent vibration, thereby greatly improving the durability of the battery module.

Also, according to an embodiment of the present disclosure, since the exposure hole of the insulation sheet is positioned so that the fuse unit is exposed to the outside, the adhesive may be appropriately applied to the fuse unit. In addition, the bus bar may be electrically insulated from external objects by the insulation sheet. At the same time, in the present disclosure, since the adhesive may be applied through the exposure hole only to the fuse unit that requires the mechanical rigidity of the bus bar, it is possible to prevent the fuse unit from being damaged due to vibration or external shock. Accordingly, the durability of the battery module may be effectively improved.

In addition, according to an embodiment of the present disclosure, since the insulation sheet has the application hole through which the adhesive is added to bond a part of the body portion of the bus bar to the module case, the body portion of the bus bar may be fixed to a part of the module case. Accordingly, vibration or shaking of the body portion of the bus bar may be prevented, thereby effectively reducing damage to the fuse unit connected to the body portion.

Further, according to another embodiment of the present disclosure, since a part of the adhesive is cured in the form of being interposed between the insulation sheet and the body portion of the bus bar it is possible to prevent movement or vibration of the adhesive even after the adhesive is cured, thereby fixing the fuse unit more stably by means of the adhesive. Accordingly, the durability of the battery module of the present disclosure may be effectively increased.

Also, according to another embodiment of the present disclosure, since the insulation sheet has the guide portion protruding inward from the exposure hole, the adhesive added to the exposure hole may be prevented from being lost around the exposure hole. Accordingly, the adhesive may be densely filled without empty spaces in the portion of the bus bar with weak mechanical rigidity. Accordingly, in the present disclosure, it is possible to reliably prevent the bus bar from being damaged or disconnected due to external shock or vibration.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 16 are tables showing an AC internal resistance (AC-IR) of a battery module A of Embodiment 1, measured in Test Examples 1 to 3 of the present disclosure.

FIG. 17 are tables showing an AC internal resistance (AC-IR) of a battery module B of Embodiment 1, measured in Test Examples 1 to 3 of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
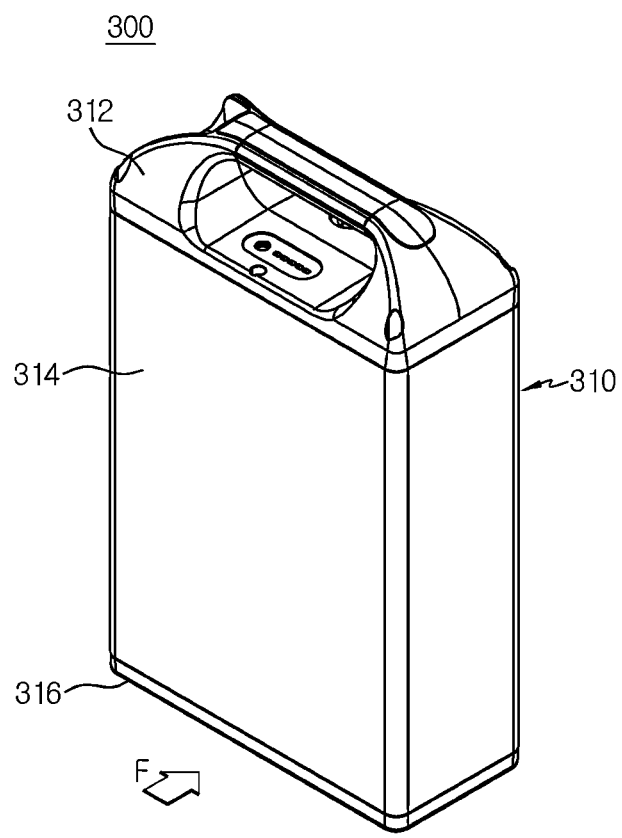
FIG. 1 is a perspective view schematically showing a battery pack according to an embodiment of the present disclosure.
Figure 2:
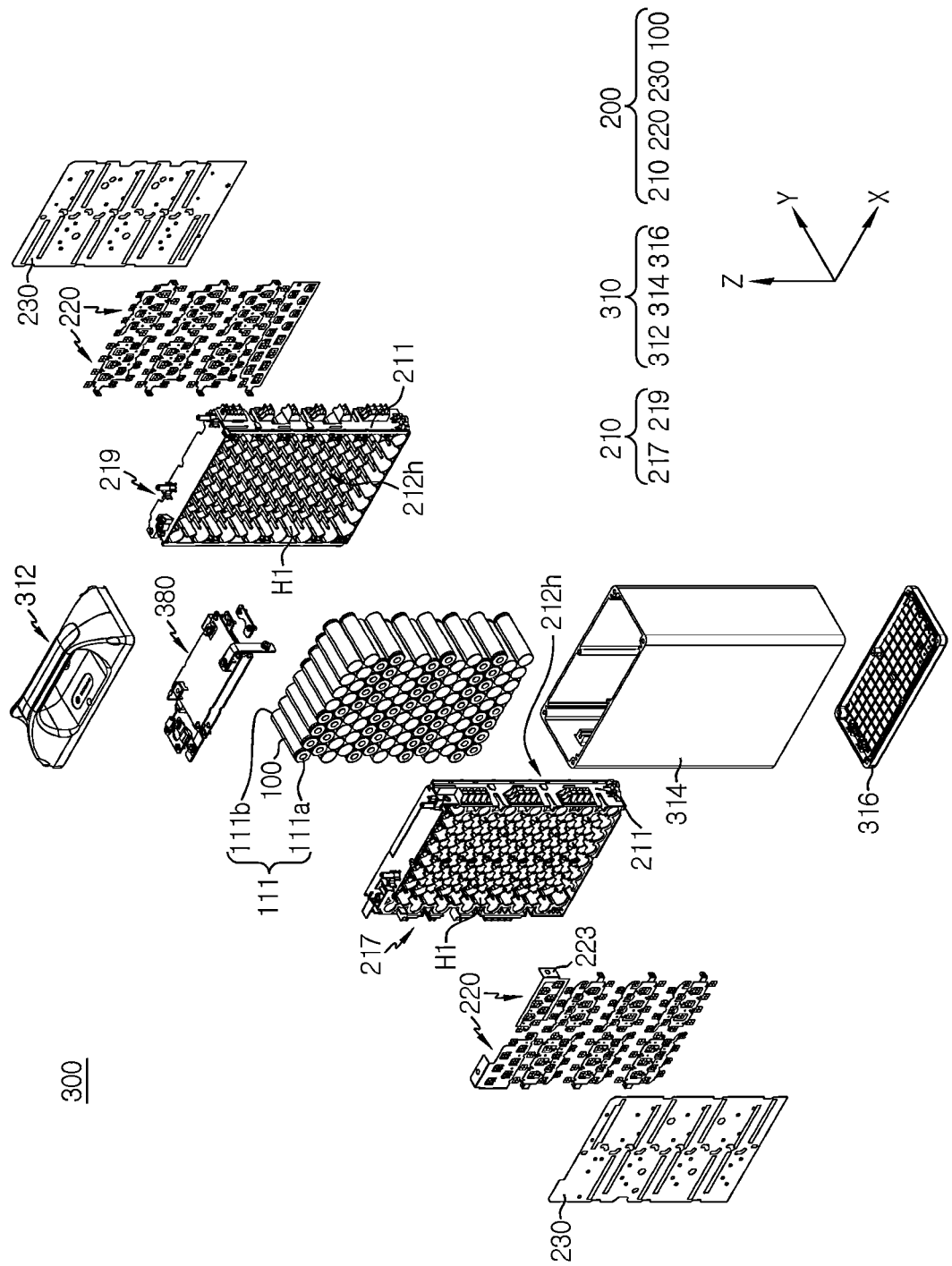
FIG. 2 is an exploded perspective view schematically showing components of a battery module of the battery pack according to an embodiment of the present disclosure.

FIG. 1 is a perspective view schematically showing a battery pack according to an embodiment of the present disclosure. FIG. 2 is an exploded perspective view schematically showing components of a battery module of the battery pack according to an embodiment of the present disclosure. Also, FIG. 3 is a sectional view schematically showing a cylindrical battery cell according to an embodiment of the present disclosure.

Figure 3:
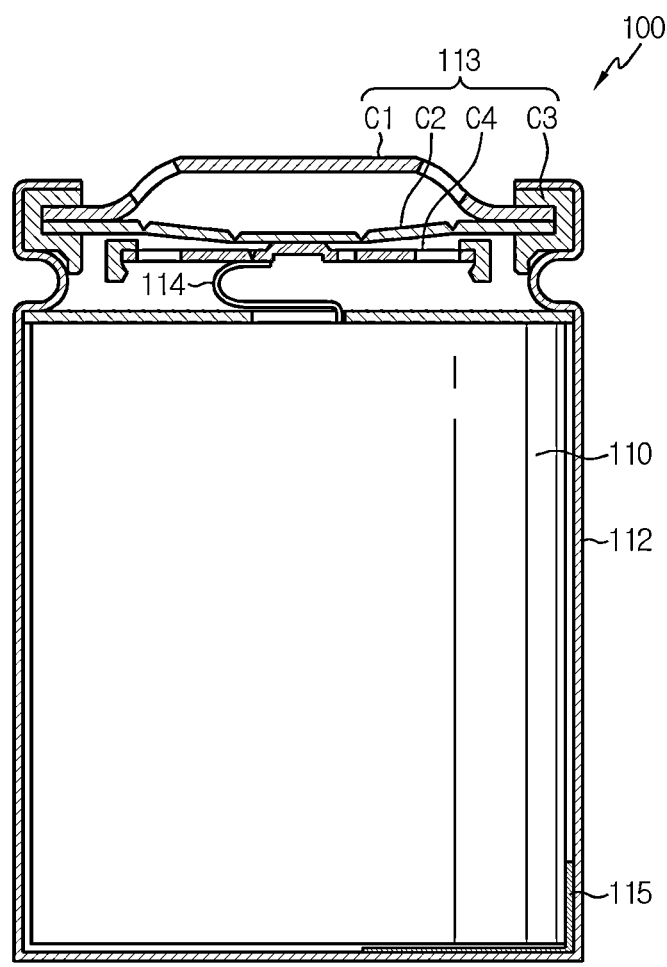
FIG. 3 is a sectional view schematically showing a cylindrical battery cell according to an embodiment of the present disclosure.

Referring to FIGS. 1 to 3, a battery module 200 of the present disclosure may include a plurality of cylindrical battery cells 100, a module case 210, a bus bar 220, and an insulation sheet 230.

Here, the cylindrical battery cell 100 may include an electrode assembly 110, a battery can 112, and a cap assembly 113.

The electrode assembly 110 may have a structure in which a positive electrode plate and a negative electrode plate are wound with a separator being interposed therebetween. Also, a positive electrode tab 114 may be attached to the positive electrode plate to be connected to the cap assembly 113, and a negative electrode tab 115 may be attached to the negative electrode plate to be connected to a bottom of the battery can 112.

The battery can 112 may have an empty space formed therein to accommodate the electrode assembly 110. In particular, the battery can 112 may be configured in a cylindrical or rectangular shape with an open top. In addition, the battery can 112 may be made of a metal material such as steel or aluminum in order to secure rigidity. Also, a negative electrode tab may be attached to the bottom of the battery can 112 so that not only the lower portion of the battery can 112 but also the battery can 112 itself may function as a negative electrode terminal.

The cap assembly 113 may be coupled to the top open portion of battery can 112 to seal an open end of the battery can 112. The cap assembly 113 may have a circular shape or a rectangular shape according to the shape of the battery can 112, and may include sub-components such as a top cap C1, a gas venting unit C2, and a gasket C3.

Here, the top cap C1 is positioned at the top of the cap assembly 113 and may be configured to protrude upward. In particular, in the cylindrical battery cell 100, the top cap C1 may function as a positive electrode terminal. Accordingly, the top cap C1 may be electrically connected to another cylindrical battery cell 100, a load, or a charging device through an external device, for example, the bus bar 220. The top cap C1 may be made of, for example, a metal material such as steel or aluminum.

The gas venting unit C2 may be configured to deform the shape of the gas venting unit C2 when the internal pressure of the cylindrical battery cell 100, namely the pressure inside the battery can 112, is increased over a predetermined level due to gas generated therein. For example, the internal gas of the battery can 112 may be ejected through the gas venting unit C2 to open the top cap C1. That is, the gas venting unit C2 may open the positive electrode terminal 111a or the negative electrode terminal 111b. For example, the cylindrical battery cell 100 may be configured to discharge internal gas by opening one of the positive electrode terminal and the negative electrode terminal by means of the gas venting unit C2 when the internal pressure is increased over a predetermined level.

Meanwhile, the cap assembly 113 may further include a current interrupt device C4. The current interrupt device C4 is also called CID. If the shape of the gas venting unit C2 is reversed as the internal pressure of the battery is increased due to gas generation, the contact between the gas venting unit C2 and the current interrupt device C4 may be cut off or the current interrupt device C4 may be damaged to cut off the electrical connection between the gas venting unit C2 and the electrode assembly 110.

The configuration of the cylindrical battery cell 100 is widely known to those skilled in the art at the time of filing of this application and thus will not be described in detail in this specification. In addition, although an example of the cylindrical battery cell 100 is shown in FIG. 3, the battery module 200 according to the present disclosure is not limited to a specific type of the cylindrical battery cell. That is, various types of battery cells known at the time of filing of this application may be employed in the battery module according to the present disclosure. That is, the cylindrical battery cell 100 of FIG. 3 is not necessarily limited to a cylindrical shape, and a rectangular battery cell may also be applied to the battery module 200 according to the present disclosure.

Referring to FIG. 2 again, the plurality of cylindrical battery cells 100 may be arranged in a left and right direction (X-axis direction) and an upper and lower direction (Z-axis direction). For example, as shown in FIG. 2, the plurality of cylindrical battery cells 100 may be configured to be arranged in an upper and lower direction and a left and right direction. Further, the plurality of cylindrical battery cells 100 may be arranged such that tubular portions of the cylindrical battery cans 112 (FIG. 3) face each other.

In particular, in the battery module 200 according to the present disclosure, the plurality of cylindrical battery cells 100 may be configured to be laid down in a horizontal direction. Here, the horizontal direction means a direction parallel to the ground. That is, as shown in FIG. 2, 112 cylindrical battery cells 100 may be configured to be elongated in a front and rear direction (Y-axis direction), respectively. In this case, in the entire cylindrical battery cells 100, when viewed in an F direction of FIG. 1, the positive electrode terminal 111a and the negative electrode terminal 111b may be located front and rear ends, respectively.

Meanwhile, terms representing directions such as front, rear, left, right, upper and lower directions used in this specification may vary depending on the position of an observer or the shape of an object. However, in this specification, for convenience of description, directions such as front, rear, left, right, upper and lower directions will be distinguishably used, based on when viewed in the F direction.

Referring to FIG. 2, the module case 210 may include an accommodation portion 212h for accommodating the plurality of cylindrical battery cells 100 and an outer wall 211.

In addition, in the accommodation portion 212h of the module case 210, at least two cylindrical battery cells 100 may be accommodated in the form of being laid down in a horizontal direction (Y-axis direction). The stacking direction is not essentially limited to one direction, and may also be an upper and lower direction (Z-axis direction) depending on the direction in which the cylindrical battery cell 100 is laid down.

Moreover, the outer wall 211 may be formed to surround the inner space in which the plurality of cylindrical battery cells 100 are inserted and accommodated. In addition, when viewed in the F direction of FIG. 1, the module case 210 may include a front wall, a rear wall, an upper wall, a lower wall, a left wall and a right wall, which are provided in front, rear, upper, lower, left and right directions to form the inner space.

In addition, the module case 210 may include a first case 217 and a second case 219. The first case 217 may be configured such that the second case 219 is stacked at the rear thereof in the Y-axis direction. For example, as shown in FIG. 2, when viewed in the Y-axis direction, the battery module 200 may include the first case 217 and the second case 219 located at the rear of the first case 217. In the accommodation portion 212h of each of the first case 217 and the second case 219 may have a plurality of hollow structures H1 in which front and rear portions of the cylindrical battery cells 100 are respectively inserted.

Figure 4:
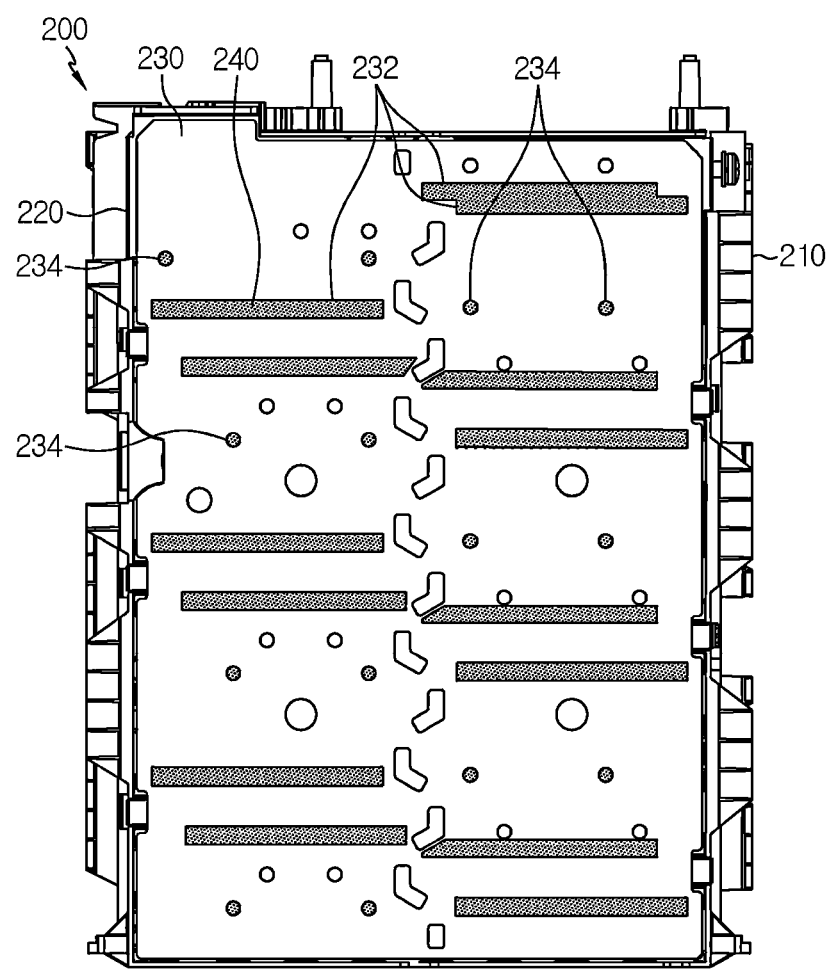
FIG. 4 is a front view schematically showing the battery module according to an embodiment of the present disclosure.
Figure 5:
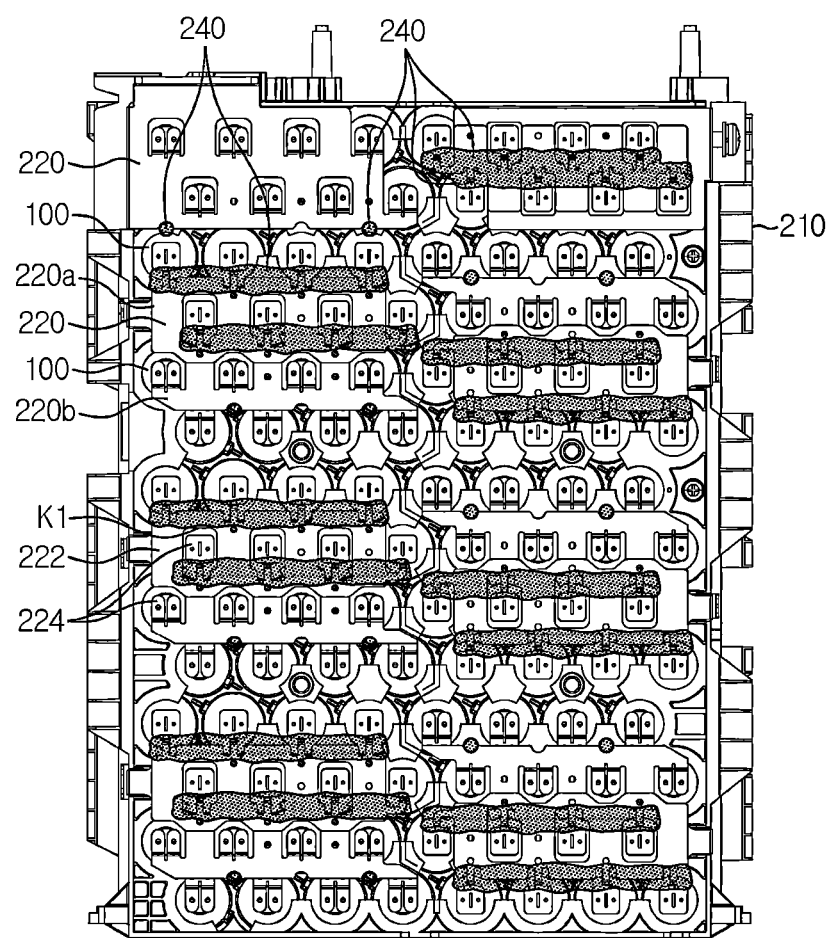
FIG. 5 is a front view schematically showing only some components of the battery module according to an embodiment of the present disclosure.
Figure 6:
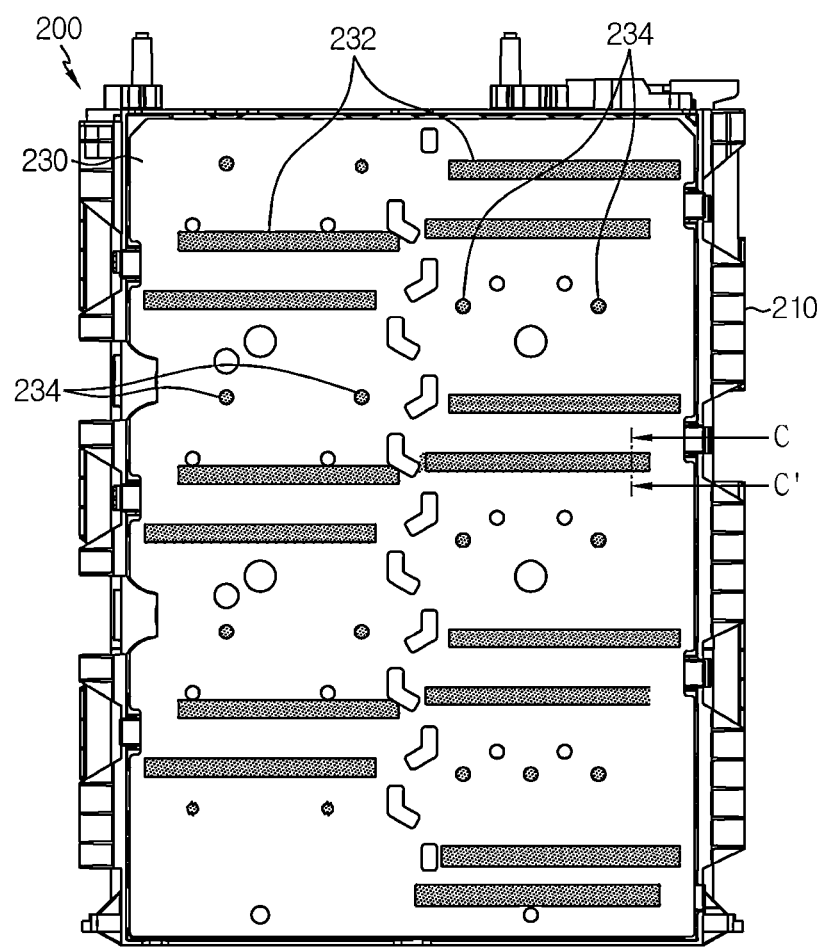
FIG. 6 is a rear view schematically showing the battery module according to an embodiment of the present disclosure.
Figure 7:
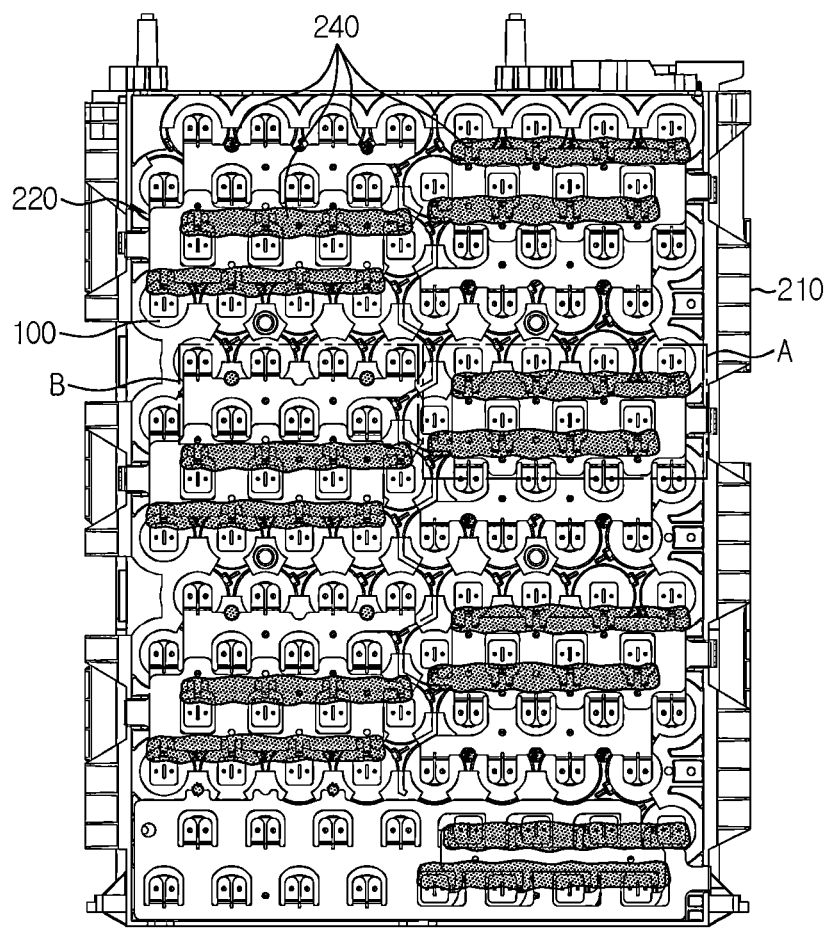
FIG. 7 is a rear view schematically showing only some components of the battery module according to an embodiment of the present disclosure.
Figure 8:
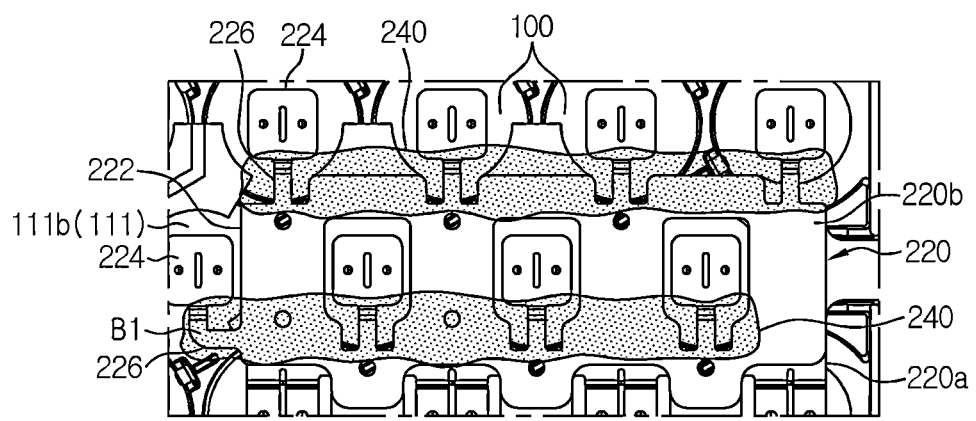
FIG. 8 is a partially enlarged view showing a portion A of FIG. 7.

FIG. 4 is a front view schematically showing the battery module 200 according to an embodiment of the present disclosure. FIG. 5 is a front view schematically showing only some components of the battery module 200 according to an embodiment of the present disclosure. FIG. 6 is a rear view schematically showing the battery module 200 according to an embodiment of the present disclosure. FIG. 7 is a rear view schematically showing only some components of the battery module 200 according to an embodiment of the present disclosure. Also, FIG. 8 is a partially enlarged view showing a portion A of FIG. 7. In FIG. 5, for convenience of description, the insulation sheet 230 is removed from the battery module 200 of FIG. 4. In addition, in FIG. 7, for convenience of description, the insulation sheet 230 is removed from the battery module 200 of FIG. 6.

First, referring to FIGS. 4 to 8, the bus bar 220 may electrically connect the plurality of cylindrical battery cells 100 to each other, and, for example, may electrically connect all cylindrical battery cells 100 to each other or some cylindrical battery cells 100 to each other. To this end, at least a portion of the bus bar 220 may be made of an electric conductivity material. For example, the bus bar 220 may be made of a metal material such as copper, aluminum and nickel. Moreover, the bus bar 220 may have a structure in which two metal plates 220a, 220b made of different main materials are bonded to each other. For example, the bus bar 220 may include a first metal plate 220a having a predetermined thickness, and a second metal plate 220b bonded to a part of the body portion 222 of the first metal plate 220a. The second metal plate 220b may have a relatively smaller thickness than the first metal plate 220a.

In addition, the second metal plate 220b may have a metal with relatively lower electric conductivity than the first metal plate 220a. For example, the first metal plate 220a may be a plate made of copper as a main material. The second metal plate 220b may be a plate made of nickel as a main material.

Moreover, the bus bar 220 may include a body portion 222 and a connection portion 224. Specifically, the body portion 222 of the bus bar 220 may be configured in a plate shape. Moreover, the bus bar 220 may be configured in the form of a metal plate to ensure rigidity and electric conductivity. In particular, the body portion 222 may be configured to stand upright in an upper and lower direction (Z-axis direction in the drawing) along the electrode terminals 111 of the plurality of cylindrical battery cells 100.

In addition, a connection hole K1 may be formed in the body portion 222. The connection hole K1 may be a hole perforated at a position corresponding to the electrode terminal 111 of the cylindrical battery cell 100.

Further, the connection portion 224 may have a shape extending and protruding from the connection hole K1 to connect to the electrode terminal 111 of the cylindrical battery cell 100. The connection portion 224 may be melted and bonded to the electrode terminal 111 by welding.

That is, in the present disclosure, if the plurality of cylindrical battery cells 100 are laid down and elongated in a front and rear direction (Y-axis direction in the drawing) and arranged in a left and right direction (X-axis direction in the drawing) and an upper and lower direction (Z-axis direction in the drawing), the electrode terminals 111 of the plurality of cylindrical battery cells 100 may be arranged in a front and rear direction. In this case, the body portion 222 may be flatly extended in a left and right direction and an upper and lower direction in a plate shape according to the arrangement direction of the electrode terminals 111 of the plurality of cylindrical battery cells 100. In addition, the body portion 222 may be configured to stand upright based on the ground.

Moreover, external terminals 223 (FIG. 2) for sensing voltage or transmitting power to the outside may be provided at left and right sides of the body portion 222 of the bus bar 220.

In addition, the bus bar 220 may contact the plurality of cylindrical battery cells 100 of the same polarity and electrically connect them in parallel. Alternatively, the bus bar 220 may contact electrode terminals 111 of some of the cylindrical battery cells 100 and electrically connect them in parallel and in series.

Referring to FIGS. 3 and 8 again, the connection portion 224 connected to any one of the positive electrode terminal 111a and negative electrode terminal 111b that is not opened by the gas venting unit C2 of the cylindrical battery cell 100 may include a fuse unit 226. The fuse unit 226 may be configured to be disconnected when a current over a predetermined level flows from the cylindrical battery cell 100. That is, if a current over a predetermined level flows, the fuse unit 226 may be partially melted and lost due to resistance heat. With this principle, the fuse unit 226 may be electrically disconnected.

In addition, the fuse unit 226 may have a structure B1 bent at least once in a horizontal direction. For example, as shown in FIG. 8, any one fuse unit 226 may have a structure B1 that in which the fuse unit 226 protrudes in a left direction from an end portion of the body portion 222 and the extended end is bent again upward.

Therefore, according to this configuration of the present disclosure, among the connection portion 224 connected to the positive electrode terminal 111a and the connection portion 224 connected to the negative electrode terminal 111b, the connection portion 224 in contact with the positive electrode terminal 111a or the negative electrode terminal 111b that is not opened by the gas venting unit C2 includes the fuse unit 226 configured to be disconnected when a current over a predetermined level flows from the cylindrical battery cell 100. Thus, when a high current flows through a specific cylindrical battery cell 100 since a short circuit occurs between the plurality of cylindrical battery cells 100 inside the battery module 200, the specific cylindrical battery cell 100 and the bus bar 220 may be electrically disconnected by the fuse unit 226. That is, by means of the fuse unit 226, it is possible to prevent a fire or runaway phenomenon of the battery module 200. Accordingly, it is possible to increase the safety of the battery module 200.

Moreover, since the fuse unit 226 is provided to the connection portion 224 in contact with the positive electrode terminal 111a or the negative electrode terminal 111b that is not opened by the gas venting unit C2, the electrode terminal 111 (e.g., the negative electrode terminal) not opened by the gas venting unit C2 is located closer to the electrode assembly than the electrode terminal 111 opened by the gas venting unit C2, thereby receiving the heat inside the cylindrical battery cell 100 more effectively. Thus, there is an advantage that the fuse unit 226 may be disconnected faster and easier by receiving the internal heat of the cylindrical battery cell 100.

In addition, since the fuse unit 226 has a structure B1 bent at least once in a horizontal direction, it is easy to secure a longer current path in the same space. In other words, if the fuse unit 226 has a shape extending in a straight line, it is necessary to form a larger connection hole, so there may be a limit in space when one bus bar 220 makes electrical connection with more cylindrical battery cells 100. Therefore, in the present disclosure, it is easy to implement a compact battery module 200 by drastically reducing the space occupied by the fuse unit 226 of the bus bar 220.

For example, as shown in FIG. 8, the fuse unit 226 may be formed only at the second metal plate 220b. In addition, the fuse unit 226 may be configured to connect the body portion 222 and the connection portion 224 connected to the negative electrode terminal 111b.

Further, an insulation sheet 230 with electric insulation may be provided to an outer surface of the bus bar 220. The insulation sheet 230 may be positioned to cover an outer side of the bus bar 220. For example, as shown in FIG. 2, two insulation sheets 230 may be provided to a front surface of the bus bar 220 located at a front side and a rear surface of the bus bar 220 located at a rear side, respectively.

Referring to FIGS. 2, 4 and 6 again, the insulation sheet 230 may have an exposure hole 232 through which at least a part of the bus bar 220 is exposed to the outside. For example, the exposure hole 232 may be shaped to extend in a left and right direction so that an adhesive 240 may be applied to a part of the bus bar 220. However, the shape of the exposure hole 232 is not necessarily limited thereto, and the shape of the exposure hole 232 may be variously modified depending on the shape of the portion where the adhesive 240 needs to be applied to the bus bar 220.

Referring to FIGS. 2 and 4 to 7 again, the battery module 200 may further include the adhesive 240. The adhesive 240 may have electric insulation. The adhesive 240 may be glue or hot-melt resin. For example, the adhesive 240 may include at least one of a polyamide resin, a polyimide resin, an epoxy resin and an acrylic resin. More specifically, the adhesive 240 may be an epoxy-based adhesive (3M, Scotch Weld DP460NS). Alternatively, the adhesive 240 may have a hot melt resin (LG CHEM, LGCEB03_T3 or Everwide JC801).

In addition, the adhesive 240 may be applied to at least a part of the bus bar 220 exposed to the outside through the exposure hole 232 of the insulation sheet 230. For example, as shown in FIG. 5, the adhesive 240 is attached to a portion (a front side) of each of the eight bus bars 220 located at a front side based on the plurality of cylindrical battery cells 100 through the exposure hole 232 of the insulation sheet 230. In addition, the adhesive 240 may be applied to a portion (a rear side) of each of the eight bus bars 220 located at a rear side based on the plurality of cylindrical battery cells 100 through the exposure hole 232 of the insulation sheet 230.

Therefore, according to this configuration of the present disclosure, the insulation sheet 230 having electric insulation is positioned to cover the outer side of the bus bar 220 and has the exposure hole 232 formed to expose at least a part of the bus bar 220 to the outside, and also the adhesive 240 having electric insulation is applied to at least a part of the bus bar 220 exposed to the outside through the exposure hole 232 of the insulation sheet 230, so it is possible to prevent a portion of the bus bar 220 with weak mechanical rigidity from being damaged. Accordingly, the battery module 200 of the present disclosure may significantly reduce the occurrence of accidents such as damage to the bus bar 220 or disconnection of the electrical connection even in an environment with external shock or frequent vibration, thereby greatly improving the durability of the battery module 200.

Referring to FIGS. 4 to 8 again, the exposure hole 232 of the insulation sheet 230 may be positioned so that the fuse unit 226 is exposed to the outside. For example, as shown in FIG. 4, the insulation sheet 230 having a plurality of exposure holes 232 may be positioned at the front side of the battery module 200. The insulation sheet 230 may be configured to be in close contact with the bus bar 220. For example, an adhesive (not shown) may be coated on one surface of the bus bar 220 that faces the insulation sheet 230. The adhesive may be configured to attach the insulation sheet 230 to the outer surface of the bus bar 220.

In addition, the exposure hole 232 of the insulation sheet 230 may be shaped to extend in a left and right direction along the fuse unit 226 of the bus bar 220. The exposure hole 232 may have a width through which the fuse unit 226 of the bus bar 220 may be exposed to the outside.

Further, as shown in FIGS. 6 and 8, the adhesive 240 added through the exposure hole 232 of the insulation sheet 230 may be applied to the fuse unit 226 formed at the bus bar 220 and then cured.

For example, as shown in FIG. 6, the insulation sheet 230 having the plurality of exposure holes 232 may be positioned at the rear side of the battery module 200. The insulation sheet 230 may be configured to be in close contact with the bus bar 220.

Therefore, according to this configuration of the present disclosure, since the exposure hole 232 of the insulation sheet 230 is positioned so that the fuse unit 226 is exposed to the outside, the adhesive 240 may be appropriately applied to the fuse unit 226. In addition, the bus bar 220 may be electrically insulated from external objects by the insulation sheet 230. At the same time, in the present disclosure, since the adhesive 240 may be applied through the exposure hole 232 only to the fuse unit 226 that requires the mechanical rigidity of the bus bar 220, it is possible to prevent the fuse unit 226 from being damaged due to vibration or external shock. Accordingly, the durability of the battery module 200 may be effectively improved.

Figure 9:
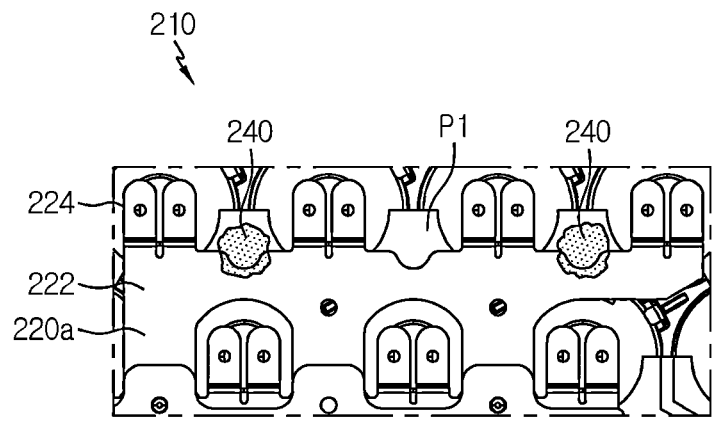
FIG. 9 is a partially enlarged view showing a portion B of FIG. 7.

FIG. 9 is a partially enlarged view showing a portion B of FIG. 7.

Referring to FIG. 9 along with FIGS. 4, 6, 7 and 8, an application hole 234 may be formed in the insulation sheet 230 so that the adhesive 240 is added therethrough. The application hole 234 may have an opened shape through which the outer surface of the module case 210 and a part of the body portion 222 of the bus bar 220 are exposed to the outside, so that a part of the body portion 222 of the bus bar 220 is bonded to the module case 210.

For example, as in FIGS. 6 and 9, a plurality of application holes 234 may be formed in the insulation sheet 230. The application hole 234 may be opened to expose a part of the first metal plate 220a of the bus bar 220 and an outer surface of a stopper P1 of the module case 210 to the outside.

For example, as shown in FIG. 9, the adhesive 240 of the present disclosure may be added to a part of the first metal plate 220a of the bus bar 220 and the outer surface of the stopper P1 of the module case 210 through the application hole 234 and then cured.

Therefore, according to this configuration in the present disclosure, since the insulation sheet 230 has the application hole 234 through which the adhesive 240 is added to bond a part of the body portion 222 of the bus bar 220 to the module case 210, the body portion 222 of the bus bar 220 may be fixed to a part of the module case 210. Accordingly, vibration or shaking of the body portion 222 of the bus bar 220 may be prevented, thereby effectively reducing damage to the fuse unit 226 connected to the body portion 222.

That is, since the fuse unit 226 is easily disconnected at the connection portion with the body portion 222, if the fuse unit 226 is fixed and the body portion 222 is also fixed to the module case 210 by means of the adhesive 240, vibration or movement of both the body portion 222 and the fuse unit 226 of the bus bar 220 may be restricted. Accordingly, in the present disclosure, it is possible to more effectively prevent the fuse unit 226 from being damaged.

Figure 10:
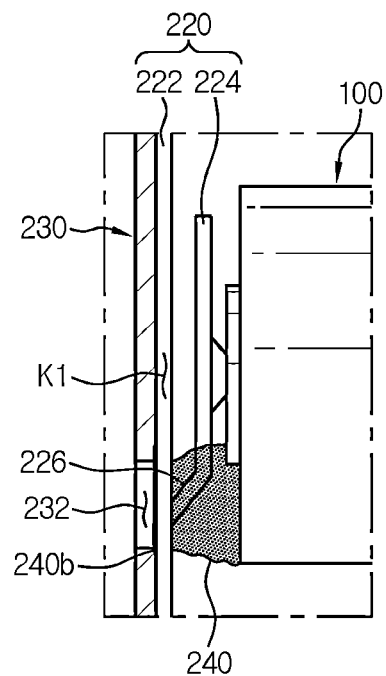
FIG. 10 is a partially sectioned view schematically showing the battery module of FIG. 6, taken along the line C-C'.

FIG. 10 is a partially sectioned view schematically showing the battery module of FIG. 6, taken along the line C-C'.

Referring to FIG. 10 along with FIGS. 6 and 8, a portion 240b of the adhesive 240 may be cured in the form of being interposed between the insulation sheet 230 and the body portion 222 of the bus bar 220. The portion 240b interposed between the insulation sheet 230 of the adhesive 240 and the body portion 222 of the bus bar 220 may serve to limit the movement or shaking after the adhesive 240 is cured. In addition, the interposed portion 240b may restrict the insulation sheet 230 and the bus bar 220 to each other, thereby preventing the insulation sheet 230 from being separated from the bus bar 220.

That is, the adhesive 240 may be injected through the exposure hole 232 of the insulation sheet 230 and the connection hole and applied to the fuse unit 226 that connects the connection portion 224 and the body portion 222 of the bus bar 220, and some of the adhesive 240 may be cured in the form of being interposed between the insulation sheet 230 and the body portion 222 of the bus bar 220.

Therefore, according to this configuration of the present disclosure, since a part of the adhesive 240 is cured in the form of being interposed between the insulation sheet 230 and the body portion 222 of the bus bar 220, it is possible to prevent movement or vibration of the adhesive 240 even after the adhesive 240 is cured, thereby fixing the fuse unit 226 more stably by means of the adhesive 240. Accordingly, the durability of the battery module 200 of the present disclosure may be effectively increased.

Figure 11:
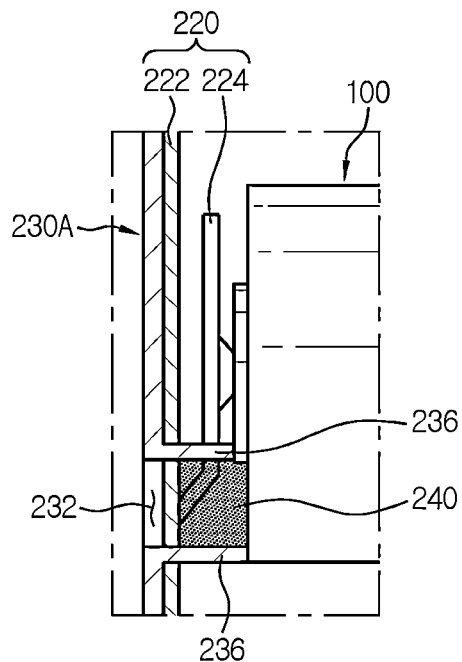
FIG. 11 is a partially sectioned view schematically showing that a battery module according to another embodiment of the present disclosure is cut in a front and rear direction of the battery module.

FIG. 11 is a partially sectioned view schematically showing that a battery module according to another embodiment of the present disclosure is cut in a front and rear direction of the battery module.

Referring to FIG. 11 along with FIGS. 6 and 8, an insulation sheet 230A of FIG. 11 has a difference in that a guide portion 236 is further provided, as compared to the insulation sheet 230 of FIG. 10. Except for the insulation sheet 230A, the same components are used.

The insulation sheet 230A may have a guide portion 236 configured to prevent the adhesive 240 added to the exposure hole 232 from being lost around the exposure hole 232. The guide portion 236 may have a structure protruding inward from the exposure hole 232.

Specifically, the guide portion 236 may have a structure protruding toward the cylindrical battery cell 100 from at least a part of an edge of the exposure hole 232 formed in the insulation sheet 230A. For example, the guide portion 236 may be shaped to protrude toward the cylindrical battery cell 100 from upper and lower portions and left and right portions of the edge of the exposure hole 232 formed in the insulation sheet 230A.

Therefore, according to this configuration of the present disclosure, since the insulation sheet 230A has the guide portion 236 protruding inward from the exposure hole 232, the adhesive 240 added to the exposure hole 232 may be prevented from being lost around the exposure hole 232. Accordingly, the adhesive 240 may be densely filled without empty spaces in the portion of the bus bar 220 with weak mechanical rigidity. Accordingly, in the present disclosure, it is possible to reliably prevent the bus bar 220 from being damaged or disconnected due to external shock or vibration.

Figure 12:
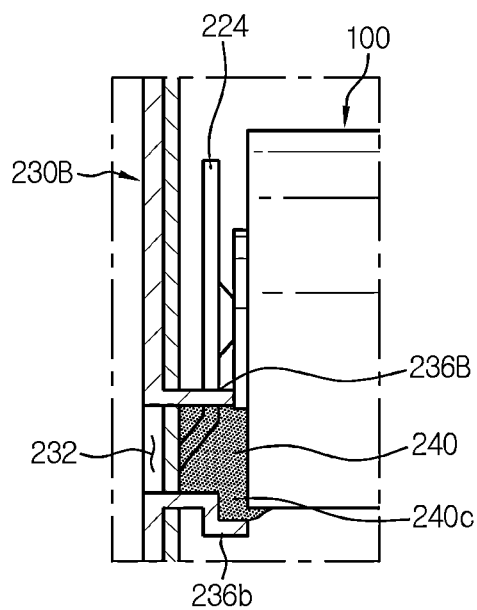
FIG. 12 is a partially sectioned view schematically showing that a battery module according to still another embodiment of the present disclosure is cut in a front and rear direction of the battery module.

FIG. 12 is a partially sectioned view schematically showing that a battery module according to still another embodiment of the present disclosure is cut in a front and rear direction of the battery module.

Referring to FIG. 12 along with FIGS. 6 and 8, a guide portion 236B of an insulation sheet 230B of FIG. 12 has a difference in that a bent structure 236b partially bent is formed, as compared with the guide portion 236 of the insulation sheet 230A of FIG. 11. Except for the guide portion 236B, the same components are used.

Specifically, the guide portion 236B may have a bent structure 236b that is formed by partially bending the guide portion 236B to cover the outer side of the cylindrical battery cell 100. A portion 240c of the adhesive 240 may have a shape corresponding to the bent structure 236b of the guide portion 236B. For example, the portion 240c of the adhesive 240 may have a stepped structure based on the cross section. The stepped structure of the adhesive 240 may play a role of preventing the adhesive 240 from being separated to the outside through the exposure hole 232 of the insulation sheet 230B. In addition, the stepped structure of the adhesive 240 may have a shape surrounding a part of the top of the cylindrical battery cell 100, which may further increase the coupling force between the adhesive 240 and the cylindrical battery cell 100.

Therefore, according to this configuration of the present disclosure, since the guide portion 236B has the bent structure 236b partially bent to cover the outer side of the cylindrical battery cell 100, the adhesive 240 may keep its coupled state more completely on the cylindrical battery cell 100. That is, the bent structure 236b of the insulation sheet 230B may form the stepped structure of the adhesive 240, and the stepped structure of the adhesive 240 may increase the fixing force by which the adhesive 240 is fixed to the top of the cylindrical battery cell 100. Accordingly, the durability of the battery module 200 may be further increased.

Figure 13:
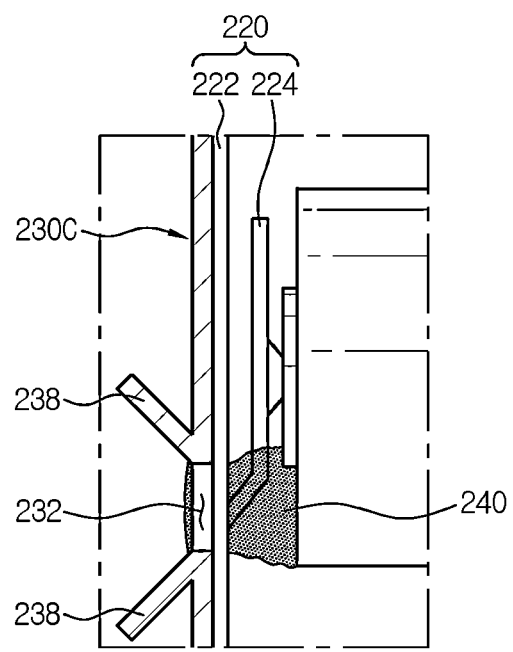
FIG. 13 is a partially sectioned view schematically showing that a battery module according to still another embodiment of the present disclosure is cut in a front and rear direction of the battery module.

FIG. 13 is a partially sectioned view schematically showing that a battery module according to still another embodiment of the present disclosure is cut in a front and rear direction of the battery module.

Referring to FIG. 13 along with FIGS. 6 and 8, an insulation sheet 230C of FIG. 13 has a difference in that a funnel portion 238 is further provided, as compared to the insulation sheet 230 of FIG. 10. Except for the insulation sheet 230C, the same components are used.

Specifically, the funnel portion 238 of the insulation sheet 230C may be configured to prevent the adhesive 240 added to the exposure hole 232 from being lost around the exposure hole 232. For example, as shown in FIG. 13, the funnel portion 238 may be shaped to protrude outward from the exposure hole 232. Here, the outward direction may be a direction in which a nozzle (not shown) configured to add adhesive 240 to the exposure hole 232 is located. Any type of nozzles currently used in the art to inject the adhesive 240 may be used, and also any coating device may be applied as long as the nozzle is provided thereto.

In addition, the funnel portion 238 may be shaped to be widened outwards in an upper and lower direction or a left and right direction based on the exposure hole 232. The funnel portion 238 may be shaped to extend along the edge of the exposure hole 232 of the insulation sheet 230C.

Therefore, according to this configuration of the present disclosure, since the insulation sheet 230C has the funnel portion 238 protruding outward from the exposure hole 232, the adhesive 240 added to the exposure hole 232 may be prevented from being lost around the exposure hole 232. Accordingly, it is possible to prevent the amount of coating from being decreased when the adhesive 240 is not added at an intended position from the exposure hole 232 but is lost. Accordingly, it is possible to effectively reduce the defective rate of the battery module 200.

Meanwhile, a battery pack 300 according to an embodiment of the present disclosure may include at least one battery module 200 as above. In addition, the battery pack 300 may further include various devices (not shown) for controlling charging and discharging of the battery module 200, such as a battery management system (BMS) 380 (FIG. 2), a current sensor and a fuse.

In addition, referring to FIGS. 1 and 2 again, the battery pack 300 may include a pack housing 310. Specifically, the pack housing 310 may include a top cover 312, a middle housing 314, and a bottom support 316. Specifically, when viewed in the F direction, the middle housing 314 may be coupled to a lower portion of the top cover 312, and the bottom support 316 may be coupled to a lower portion of the middle housing 314. More specifically, the top cover 312 may include an upper wall and a side wall to cover the upper portion of the module case 210 accommodated in the pack housing 310. In addition, the middle housing 314 may have a rectangular tubular shape with open upper and lower portions. Further, the bottom support 316 has a box shape with an open top, and may include a side wall and a lower wall.

Meanwhile, the battery pack 300 according to an embodiment of the present disclosure may be included in a vehicle (not shown) such as an electric vehicle or a hybrid electric vehicle. That is, the vehicle according to an embodiment of the present disclosure may include at least one battery pack 300 according to an embodiment of the present disclosure described above, which is mounted in a vehicle body.

Hereinafter, in order to specifically describe the present disclosure, embodiments and test examples will be described in more detail, but the present disclosure is not limited by these embodiments and test examples. The embodiments according to the present disclosure may be modified in various different forms, and the scope of the present disclosure should not be construed as being limited to the embodiments described below. The embodiments of the present disclosure are provided to more completely explain the present disclosure to those having average knowledge in the art.

Embodiment 1

Figure 14:
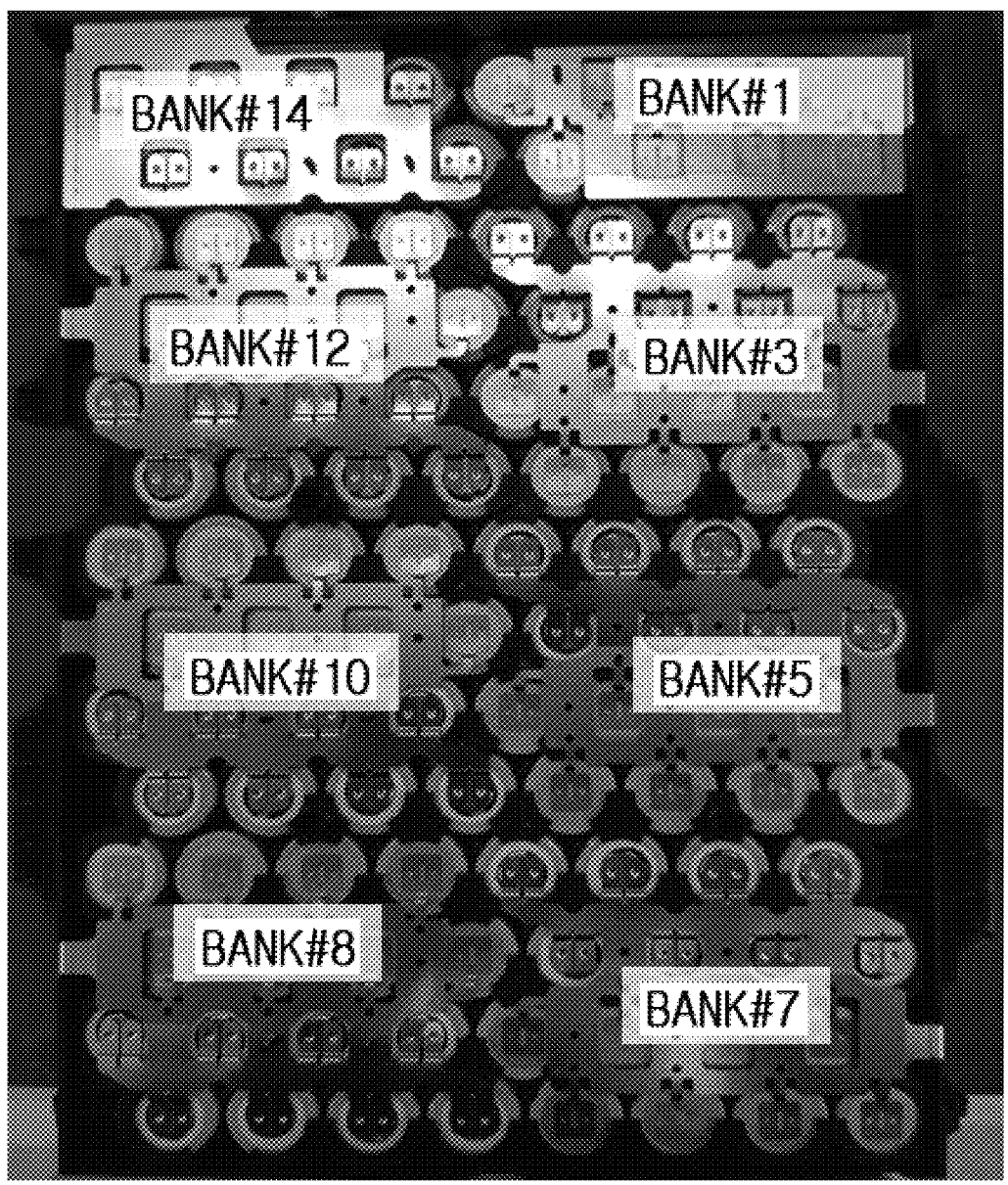
FIGS. 14 and 15 are photographs showing a front surface and a rear surface of a battery module according to Embodiment 1 of the present disclosure.
Figure 15:
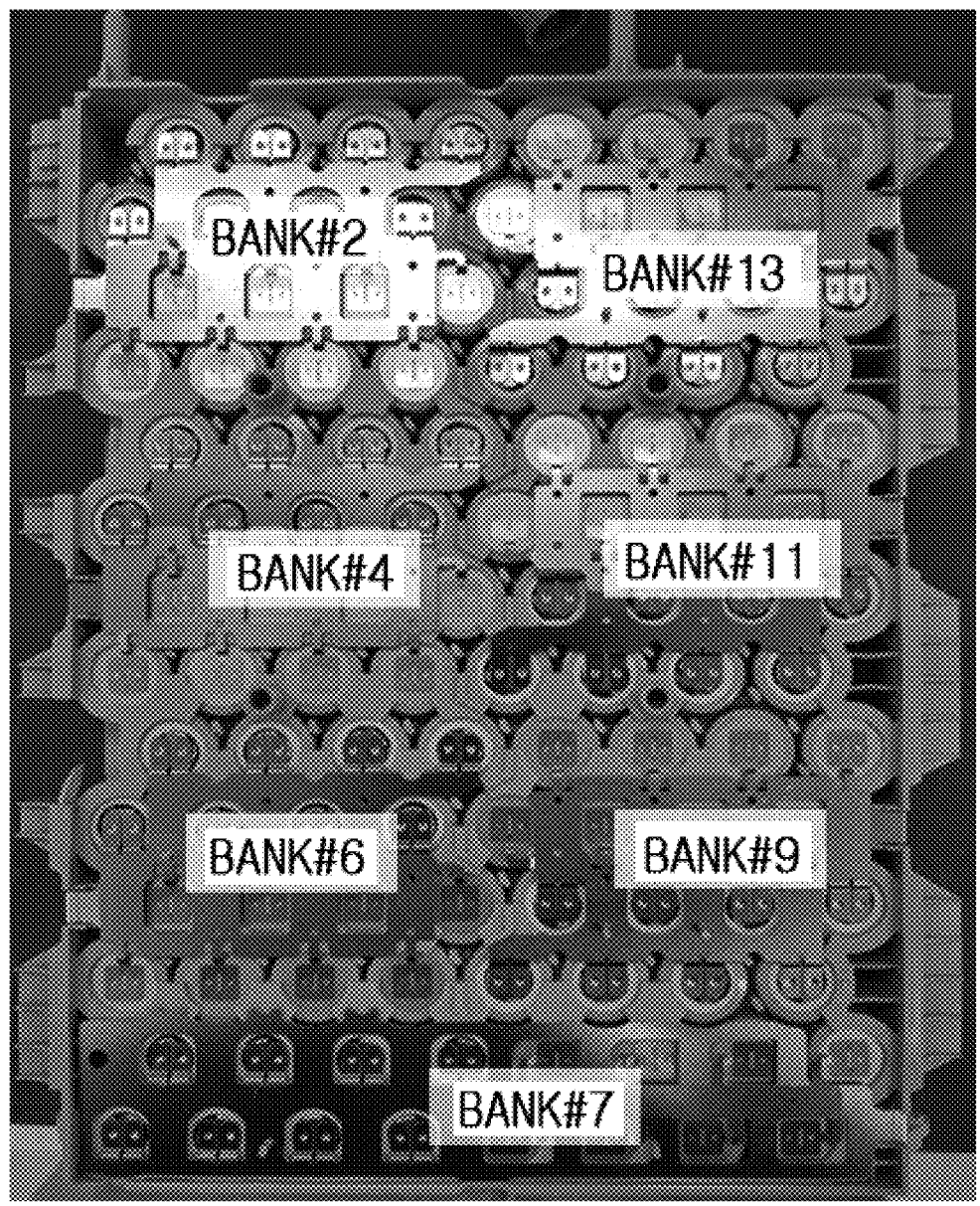

A battery module A according to an embodiment of the present disclosure was prepared to include 112 cylindrical battery cells, a module case capable of accommodating the cylindrical battery cells, 15 bus bars configured to electrically connect the 112 cylindrical battery cells, and two insulation sheets configured to cover the bus bars. An epoxy-based adhesive (3M, Scotch Weld DP460NS) was applied around a fuse unit of the bus bar through an exposure hole formed in the insulation sheet. At this time, the adhesive had a base viscosity of 150,000 cps to 275,000 cps, an accelerator viscosity of 8,000 cps to 14,000 cps, and a working time of 1 hour or less. The adhesive was applied with a width of 4 mm and a thickness of 2 mm for each application site, and the applied amount was about 10 g per insulation sheet. The battery module A was prepared as shown in the photographs of FIGS. 14 and 15.

Embodiment 2

A battery module B was manufactured in the same manner as in Embodiment 1.

Test Example 1

Z-Axis Direction Vibration Test

First, 112 cylindrical battery cells respectively included in the battery module A and the battery module B of Embodiments 1 and 2 were divided into 14 banks. AC internal resistance (AC-IR) and DC voltage of each bank were measured using a HIOKI tester. The measured AC internal resistance values are shown in the table of FIG. 16 and the table of FIG. 17, respectively. In addition, all of 14 banks of the battery module A and the battery module B of Embodiments 1 and 2 were measured to be in the normal ranges of 4.8 mΩ to 5.7 mΩ and 3.50V to 3.60V.

After that, each of the battery module A and the battery module B was subjected to a vibration test in the Z-axis direction (upper and lower direction). The vibration time was 3 hours, and the vibration test was conducted in 12 cycles for 7 Hz to 200 Hz.

After the vibration test in the Z-axis direction is completed, the AC internal resistance (AC-IR) of 14 banks of the battery module A and the battery module B was measured. The measured AC internal resistance values are shown in the table of FIG. 16 and the table of FIG. 17, respectively. As a result of the test, all of 14 banks of the battery module A and the battery module B of Embodiments 1 and 2 were measured to be in the normal ranges of 4.8 mΩ to 5.8 mΩ and 3.50V to 3.60V.

Test Example 2

Y-Axis Direction Vibration Test

After Test Example 1 is performed, each of the battery modules of Embodiments 1 and 2 was subjected to a vibration test in the Y-axis direction (left and right direction). The vibration time was 3 hours, and the vibration test was conducted in 12 cycles for 7 Hz to 200 Hz.

After the vibration test in the Y-axis direction is completed, the AC internal resistance (AC-IR) of 14 banks of the battery modules was measured. The measured values are shown in the table of FIG. 16 and the table of FIG. 17, respectively. All of 14 banks of the battery modules of Embodiments 1 and 2 were measured to be in the normal range of 4.8 mΩ to 5.8 mΩ, and 3.50V to 3.60V.

Test Example 3

X-Axis Direction Vibration Test

After Test Example 2 is performed, each of the battery modules of Embodiments 1 and 2 was subjected to a vibration test in the X-axis direction (left and right direction). The vibration time was 3 hours, and the vibration test was conducted in 12 cycles for 7 Hz to 200 Hz.

After the vibration test in the X-axis direction was completed, the AC internal resistance (AC-IR) of 14 banks of the battery modules was measured. The measured values are shown in the table of FIG. 16 and the table of FIG. 17, respectively. All of 14 banks of the battery modules of Embodiments 1 and 2 were measured to be in the normal range of 4.8 mΩ to 5.8 mΩ, and 3.50V to 3.60V.

In conclusion, as a result of Test Examples 1 to 3, the battery module according to an embodiment of the present disclosure may supplement the mechanical stiffness of the bus bar by applying the adhesive using the insulation sheet having the exposure hole through which a portion of the bus bar with weak mechanical rigidity is exposed, so it is possible to prevent the portion of the bus bar with weak mechanical rigidity from being damaged even in a vibration environment of various directions such as Z-axis, X-axis and Y-directions. Accordingly, the battery module of the present disclosure may significantly reduce the occurrence of accidents such as damage to the bus bar or disconnection of the electrical connections even in an environment with external shock or frequent vibration, thereby greatly improving the durability of the battery module.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 100: cylindrical battery cell | 200: battery module |
| 111, 111a, 111b: electrode terminal, positive electrode terminal, negative electrode terminal | |
| 210: module case | |
| 212h: accommodation portion | 211: outer wall |
| H1: hollow structure | |
| 230: insulation sheet | 232: exposure hole |
| 234: application hole | 236: guide portion |
| 236b: bent structure | 238: funnel portion |
| 240: adhesive | |
| 220: bus bar | |
| 222: body portion | 224: connection portion |
| 226: fuse unit | |
| 310: pack housing | 312: top cover |
| 314: middle housing | 316: bottom support |

What is claimed is:

1. A battery module, comprising:
   a plurality of cylindrical battery cells each respectively having electrode terminals;
   a module case having an accommodation portion in which the plurality of cylindrical battery cells are accommodated;
   a bus bar including a plate-shaped and electrically conductive body portion, and a connection portion configured to contact the electrode terminals to electrically connect the plurality of cylindrical battery cells to each other;
   an electrically insulating insulation sheet covering an outer side of the bus bar, the insulation sheet having an exposure hole through which at least a part of the bus bar is exposed to an outside of the battery module; and
   an electrically insulating adhesive on the at least a part of the bus bar exposed to the outside through the exposure hole of the insulation sheet,
   wherein the bus bar includes a fuse unit connecting the connection portion and the body portion to each other, the fuse unit being configured to be disconnected when a current over a predetermined level flows from a respective one of the cylindrical battery cells, and
   wherein the exposure hole of the insulation sheet is located to expose the fuse unit to the outside.

2. The battery module according to claim 1, wherein each cylindrical battery cell includes a negative electrode terminal and a positive electrode terminal respectively at one end and the other end thereof, each cylindrical battery cell having a gas venting unit configured to discharge an internal gas by opening any one of the positive electrode terminal and the negative electrode terminal when an internal pressure increases over a predetermined level, and
   wherein the fuse unit of the bus bar connected only to the connection portion that is connected to the positive electrode terminal or the negative electrode terminal opened by the gas venting unit of the respective one of the cylindrical battery cells.

3. The battery module according to claim 1, wherein the insulation sheet has an application hole through which the adhesive is added to bond a part of the body portion of the bus bar to the module case.

4. The battery module according to claim 1, wherein a part of the adhesive is cured to be interposed between the insulation sheet and the body portion of the bus bar.

5. The battery module according to claim 1, wherein the insulation sheet has a guide portion protruding inward from the exposure hole to prevent the adhesive added to the exposure hole from being lost around the exposure hole.

6. The battery module according to claim 5, wherein the guide portion has a bent structure formed by bending a part thereof to cover an outer side of the respective one of the cylindrical battery cells.

7. The battery module according to claim 1, wherein the insulation sheet has a funnel portion protruding outward from the exposure hole to prevent the adhesive added to the exposure hole from being lost around the exposure hole.

8. A battery pack, comprising at least one battery module according to claim 1.

9. A vehicle, comprising at least one battery pack according to claim 8.

* * * * *